United States Patent
Housley

(10) Patent No.: US 8,801,926 B2
(45) Date of Patent: Aug. 12, 2014

(54) SINK COLANDER AND STORAGE ASSEMBLY

(76) Inventor: Todd Housley, McKinney, TX (US)

( * ) Notice: Subject to any disclaimer, the term of this patent is extended or adjusted under 35 U.S.C. 154(b) by 923 days.

(21) Appl. No.: 12/875,611

(22) Filed: Sep. 3, 2010

(65) Prior Publication Data

US 2012/0285879 A1  Nov. 15, 2012

(51) Int. Cl.
| | |
|---|---|
| *B01D 35/00* | (2006.01) |
| *B01D 35/02* | (2006.01) |
| *B01D 35/027* | (2006.01) |
| *B01D 29/37* | (2006.01) |
| *B01D 35/28* | (2006.01) |
| *A47J 47/20* | (2006.01) |
| *A47J 43/24* | (2006.01) |

(52) U.S. Cl.
USPC ............... 210/232; 210/249; 210/474; 4/656; 4/657

(58) Field of Classification Search
USPC ............... 210/232, 474, 249; 4/656, 657
See application file for complete search history.

(56) References Cited

U.S. PATENT DOCUMENTS

| | | | | |
|---|---|---|---|---|
| 160,540 | A * | 3/1875 | Murdock | 4/656 |
| 981,448 | A * | 1/1911 | Matthews | 4/290 |
| 2,309,851 | A | 2/1943 | Kuhne | |
| 2,691,237 | A | 10/1954 | Hawley | |
| 3,625,162 | A | 12/1971 | Crew | |
| 3,742,965 | A | 7/1973 | Hudziak | |
| 4,033,461 | A | 7/1977 | Nevai | |
| 4,456,021 | A | 6/1984 | Leavens | |
| D324,902 | S | 3/1992 | Kohler, Jr. et al. | |
| 5,181,285 | A * | 1/1993 | Kolada | 4/657 |
| 5,217,123 | A | 6/1993 | Riley et al. | |
| D338,261 | S | 8/1993 | Kolada | |
| 5,279,007 | A * | 1/1994 | Kolada | 4/639 |
| 5,590,804 | A | 1/1997 | Crum et al. | |
| 5,715,547 | A | 2/1998 | Becker et al. | |
| 5,823,366 | A | 10/1998 | Bellamy | |
| 5,865,325 | A | 2/1999 | Comstock | |
| 6,039,887 | A | 3/2000 | Licari | |
| 6,276,675 | B1 * | 8/2001 | Shamoon | 269/289 R |
| 6,341,704 | B1 | 1/2002 | Michel, Jr. | |
| 6,508,368 | B1 | 1/2003 | Arce, Jr. | |
| 6,547,080 | B1 | 4/2003 | Guard | |
| 6,698,464 | B2 | 3/2004 | Hennemann, Jr. et al. | |
| 6,783,674 | B2 | 8/2004 | Iannizzotto et al. | |

(Continued)

FOREIGN PATENT DOCUMENTS

| | | |
|---|---|---|
| EP | 1442691 A1 * | 8/2004 |
| JP | 2003020707 A | 1/2003 |
| JP | 2010035749 A | 2/2010 |

OTHER PUBLICATIONS

Power Lock Suction SinkWorks Sponge and Scrubber Combo found at http://www.amazon.com/Rubbermaid-1G15M6FRST-Evolution-Divider-Frost/dp/B000IZANR2.

(Continued)

*Primary Examiner* — Thomas M Lithgow

(74) *Attorney, Agent, or Firm* — Gardere Wynne Sewell LLP

(57) ABSTRACT

A colander assembly having a base member and a basket device removeably connectable to the base member. The basket device includes a bottom wall, a front wall, a rear wall, and first and second sidewalls forming a basket or storage area, wherein the bottom wall and first and second sidewalls are positionable between a storage position and an extended or use position.

16 Claims, 3 Drawing Sheets

(56) References Cited

U.S. PATENT DOCUMENTS

| | | |
|---|---|---|
| D558,535 S | 1/2008 | Curtin |
| D558,538 S | 1/2008 | Curtin |
| D595,914 S | 7/2009 | Housley |
| 7,678,271 B2 | 3/2010 | Curtin |
| 2004/0250345 A1 | 12/2004 | Kaster |
| 2010/0251906 A1 | 10/2010 | Repp et al. |

OTHER PUBLICATIONS

Clear Saddlebag Sink Tray/Basket found at http://www.hangercity.com/sador.html.

Simplehuman Sink Caddy, Stainless Steel found at http://www.amazon.com/Simplehuman-Sink-Caddy-Stainless-Steel/dp/B002WGHKWQ/ref=pd_sbs_hg_21.

OXO Good Grips Suction Large Basket found at http://www.amazon.com/Oxo-Grips-1213400-Suction-Basket/dp/B00179DLWC/ref=pd_sbs_hg_52.

Rubbermaid Evolution Snk Divider Mat found at http://www.amazon.com/Rubbermaid-1G15M6FRST-Evolution-Divider-Frost/dp/B0001ZANR2.

Adjustable Dish Brush and Spong Holder found at http://www.amazon.com/Adjustable-Dish-Brush-Sponge-Holder/dp/B001YHTWFC/ref=pd_sbs_hg_29.

Flat Fold Colander found at http://www.aliexpress.com/product-fm/334191129-Flat-Fold-Colander-Folding-colander-as-seen-on-tv-items-with-free-shipping-wholesalers.html.

International Search Report for Co-Pending PCT Application No. PCT/US2011/049457 mailed Mar. 26, 2012.

International Preliminary Report on Patentability issued Mar. 14, 2013 including Written Opinion in corresponding application No. PCT/US2011/049457.

\* cited by examiner

SINK COLANDER AND STORAGE ASSEMBLY

BACKGROUND

Colanders of various sizes and shapes are commonly used to rinse foods such as fruits, vegetables, pasta and the like. However, such colanders are difficult to handle during use and can consume large amounts of space. For example, many colanders require the user to either manually hold the colander over a sink or otherwise balance it on the countertop. This oftentimes results in inadvertent spilling of the contents from the colander basket if balance is not adequately maintained and/or the user drops the colander. Furthermore, when not in use, such colanders are inconvenient to store in a compact fashion.

DETAILED DESCRIPTION

Figure 1:
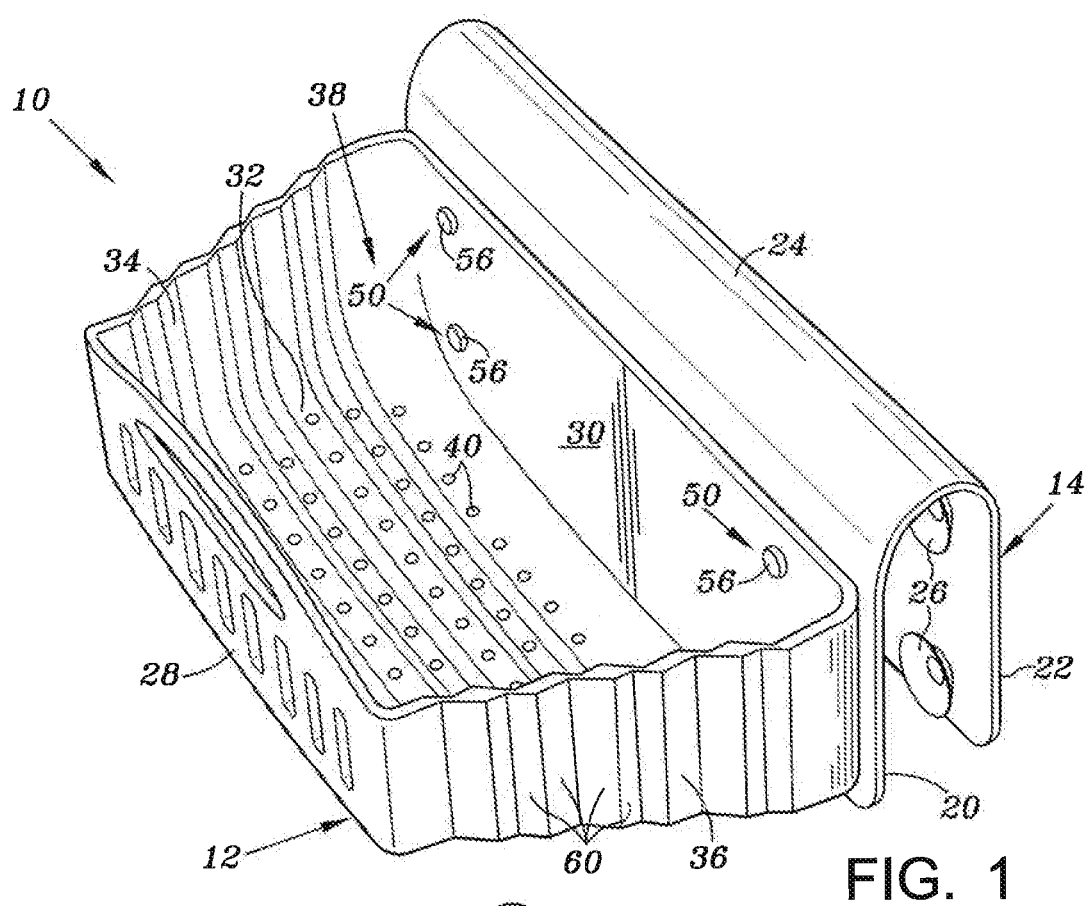
FIG. 1 is a diagram of a sink colander and storage assembly in which a removable and collapsible basket device is employed to advantage.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 2:
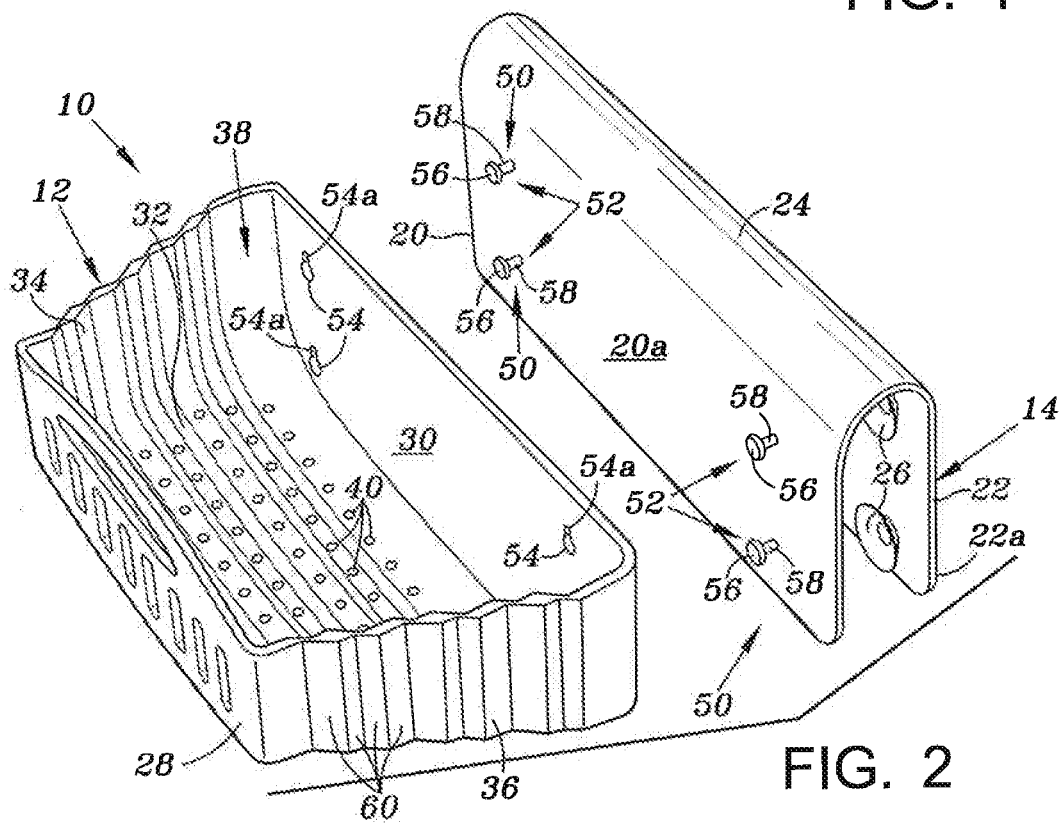
FIG. 2 is a diagram of the sink colander and storage assembly of FIG. 1 illustrating the basket device detached from a storage assembly base member.
Figure 3:
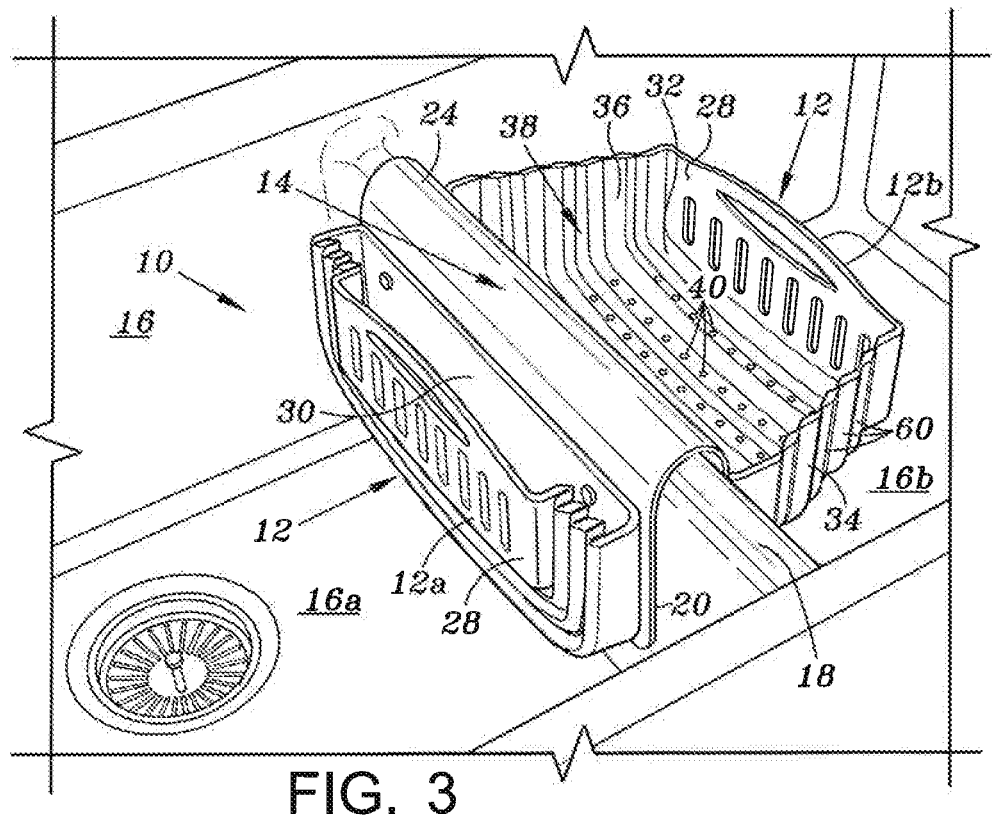
FIG. 3 is a diagram of the sink colander and storage assembly of FIGS. 1 and 2 illustrating a first basket device in a collapsed position and a second basket device in an extended or use position.
Figure 4:
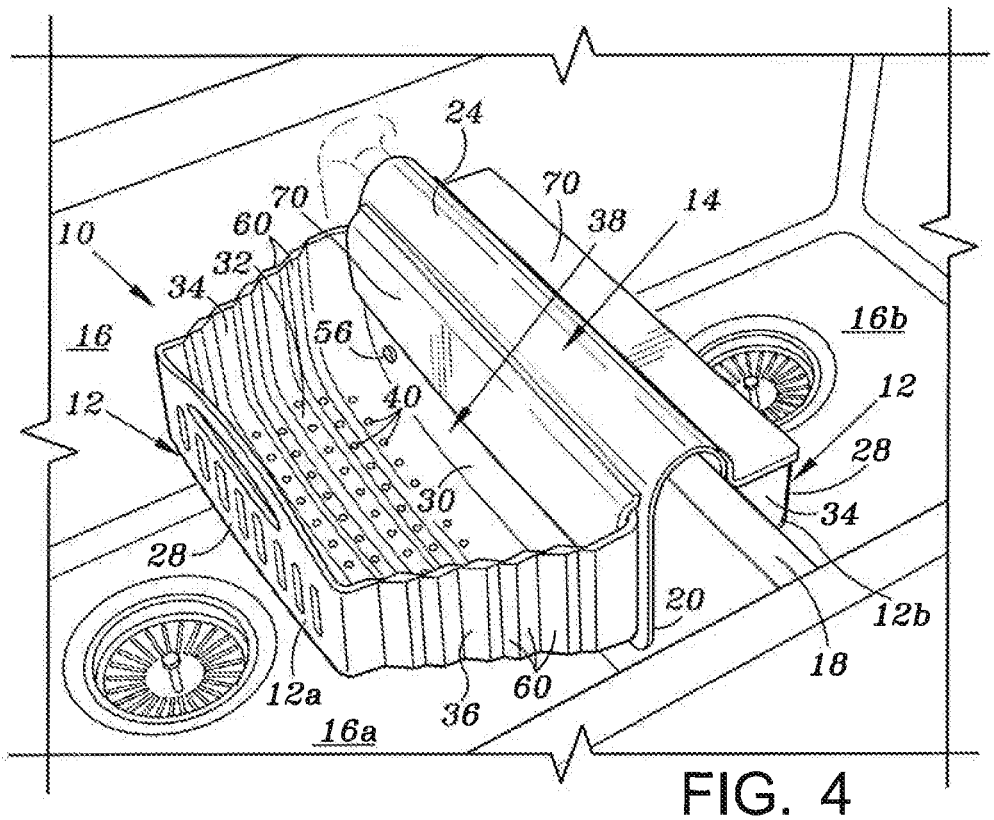
FIG. 4 is a diagram of the sink colander and storage assembly of FIGS. 1-3 employing a cover.

FIGS. 1 and 2 are diagrams illustrating a sink colander and storage assembly 10 in which a removable and collapsible basket device 12 is employed to advantage. In the embodiment illustrated in FIGS. 1 and 2, storage assembly 10 comprises a base member 14 to releasably support basket device 12 within a sink 16 (FIGS. 3 and 4). For example, in the embodiment illustrated in FIG. 3, base member 14 is fastened to a sink divider 18 such that basket device 12 can be secured thereto and extend within sink 16. In FIGS. 1 and 2, basket device 12 is a colander to enable a user to rinse fruits and vegetables, drain pastas and other foods, and/or place any other type of content (silverware, etc.) within colander 12 for rinsing, draining, storage or otherwise. In addition, while storage assembly 10 is illustrated within a sink 16, it should be understood that storage assembly 10 may be otherwise used, such as, for example, in a bathtub or shower area. As explained in further detail below, embodiments further provide a storage assembly 10 having a basket device 12 configured between a collapsed position (FIG. 3) for storage thereof or an extended or use position (FIGS. 1, 2 and 4).

Preferably, base member 14 is formed of a flexible sheet of polymeric material; however, it should be understood that any material may be used. Referring specifically to FIG. 2, base member 14 comprises a generally rectangular and foldable sheet having a first attachment section 20 and corresponding surface 20a, a second attachment section 22 and corresponding surface 22a, and a hinged section 24 connecting the first and second sections 20 and 22. Referring specifically to FIGS. 2-4, hinged section 24 is disposed over sink divider 18 to enable first section 20 to rest within sink area 16a and to enable second section 22 to rest within second sink area 16b.

In the embodiment illustrated in FIGS. 1-4, base member 14, and in particular, first and second sections 20 and 22, are secured to sink divider 18 via one or more suction cups 26. In particular, sections 20 and 22 each comprise one or more suction cups 26 disposed thereon so as to securely fasten base member 14 to both sides of sink divider 18. It should be understood, however, that base member 14 may be otherwise connected to sink 16, such as, for example, via an adhesive, frictional engagement, magnetically or otherwise.

Basket device 12 includes a front wall 28, a rear wall 30, a bottom wall 32 and a pair of sidewalls 34 and 36 forming a basket or storage area 38. Bottom wall 32 optionally includes openings 40 therein to facilitate drainage from basket area 38 and into sink 16 in the event basket device is used as a rinsing device or colander, for example.

Embodiments provided herein enable basket device 12 to be removed or otherwise detached from base member 14. For example, when it is necessary to clean basket device 12, a user can easily detach basket device 12 from base 14. Preferably, base member 14 comprises a locking system 50 (FIG. 2), which is used to securely fasten basket device 12 to base member 14. Briefly, locking mechanism 50 includes one or more extensions 52 extending from sections 20 and 22 that are sufficiently spaced apart to align with and otherwise engage corresponding openings 54 disposed on rear wall 30 of basket device 12. In the embodiment illustrated in FIGS. 1 and 2, locking system 50 comprises four extensions 52 disposed generally adjacent to corners of each section 20 and 22; however, it should be understood that a greater or fewer number of extensions 52 and corresponding openings 54 may be utilized.

Referring specifically to FIG. 2, each extension 52 comprises a boss 56 disposed on a post 58. Each boss 56 and post 58 are sized so as to be insertable within a respective opening 54 to enable post 58 to otherwise engage upper portion 54a of opening 54. Thus, when post 58 is disposed within upper portion 54a, boss 56, which contains a larger diameter relative to the diameter of upper portion 54a of opening 54, prevents or otherwise resists lateral removal of basket device 12 from base member 14. When coupling basket device 12 to base member 14, openings 54 are aligned with and are otherwise positioned to receive boss 56. Once inserted, basket device 12 is lowered such that posts 58 rest within upper portions 54a of openings 54. It should be understood that colander 12 may be otherwise attached to base member 14, such as, for example, via a snap or a friction fit, via a hook and loop fastener, magnetically or by any other means.

Referring specifically to FIG. 3, storage assembly 10 contains two basket devices 12a and 12b disposed within respective sink areas 16a and 16b. As illustrated in FIG. 3, basket device 12a is configured in a collapsed or stored position and basket device 12b in configured in an extended or use position. Accordingly, in lieu of detaching basket device 12a from base member 14 during periods of non-use, colander 12a can be configured in a collapsed position and remain coupled to base member 14 without obstructing or otherwise preventing access to sink 16a.

Preferably, when basket device 12 is configured in a collapsed or stored position, basket device 12 extends outward approximately 1.5 inches. When basket device 12 is configured in the extended or use position, basket device 12 extends outward approximately 5 inches.

In the embodiment illustrated in FIGS. 1-4, sidewalls 34 and 36 and bottom wall 32 are formed of foldable accordion-like segmented portions 60 such that when colander 12 is configured in the collapsed/stored position, segmented portions 60 are adjacently positioned in a folded configuration. In the embodiment illustrated in FIG. 4, base 14 may optionally contain a flexible cover 70 so as to cover or otherwise prevent water and other debris from entering into basket area 38 when colander 12 is in the stored position. As colander 12 is positioned in the use position, cover 70 folds into basket area 38 to prevent access into basket area 38 to remain clear of and permit unrestricted access.

It should be understood that while storage assembly 10 is illustrated disposed over sink divider 18, it should be understood that base 14 may be otherwise formed or sized so as to be secured directly to any sidewall of sink 16. For example, base member 14 may be formed solely of section 20 having suction cups 26 coupled thereto for attaching a sidewall of sink 16. Likewise, basket device 12 may incorporate suction cups 26 disposed directly thereon for direct attachment to any sidewall of sink 16.

Figure 5:
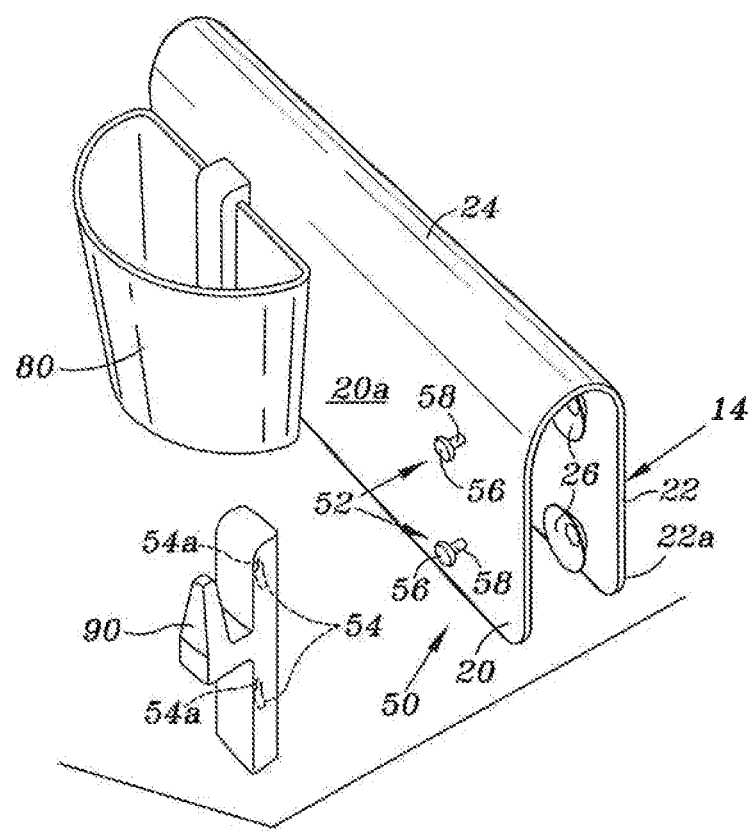
FIG. 5 is a diagram of the storage assembly base member of FIGS. 1-4 used in connection with various removable accessories.

FIG. 5 is a diagram of base member 24 of FIGS. 1-4 used in connection with various removable sink accessories 80 and 90. In FIG. 5, sink accessory 80 comprises a storage compartment or cup for storing items such as a soap container, scrubber brushes or any other object. Sink accessory 90 includes a hook portion to enable scrubber brushes or rags to be mounted thereon. It should be understood that accessories 80 and 90 can be any size or shape. For example, sink accessory 80 can extend substantially along the length of base member 24 for storing larger and/or more items therein. In the embodiment illustrated in FIG. 5, sink accessories 80 and 90 are configured to be removably coupleable to base member 24 via locking system 50.

Although embodiments of the colander assembly 10 have been described in detail, those skilled in the art will also recognize that various substitutions and modifications may be made without departing from the scope and spirit of the appended claims.

What is claimed is:

1. A sink colander assembly, comprising:
   a base member; and
   a basket device removably coupleable to the base member, the basket device having a bottom wall, a front wall, a rear wall, and first and second sidewalls forming a storage area;
   at least one collapsible segment formed in the pair of side walls and the bottom wall, the at least one collapsible segment continuously extending from one sidewall, along the bottom wall, to the other side wall, the at least one collapsible segment operable to facilitate expansion and retraction of the colander, wherein the bottom wall and first and second sidewalls are positionable between a collapsed position and an extended position.

2. The assembly of claim 1, wherein the basket device is removably coupleable to at least one extension disposed on the base.

3. The assembly of claim 1, wherein the base member is removably coupleable to a sink.

4. The assembly of claim 1, wherein the bottom wall comprises drainage openings.

5. The assembly of claim 1, wherein the first and second sidewalls and the bottom wall are formed of segmented portions, the segmented portions are foldable in the collapsed position, the collapsed position being a storage position.

6. The assembly of claim 1, wherein the single sink wall is a divider wall of a sink and wherein the base overlays the divider wall so as to extend within a first sink area and a second sink area.

7. The assembly of claim 6, wherein the basket device is removably coupleable to the base in either the first sink area or the second sink area.

8. The assembly of claim 1, wherein the base member comprises a first section, a second section and a hinged portion connecting the first and second sections.

9. The assembly of claim 1, further comprising a cover to enclose the basket device when in the collapsed position.

10. A collapsible colander assembly for use in a sink, the colander assembly comprising:
    a base configured to be supported by and removably coupleable to a sink wall; and
    a collapsible colander removably coupleable to the base, the collapsible colander operable to move between an extended position and a collapsed position, the collapsible colander comprising:
    a rear wall for positioning adjacent the base and configured to be removably coupleable to the base;
    a front wall opposite the rear wall, wherein the front wall remains substantially parallel to the rear wall when the collapsible colander is in the extended position and in the collapsed position;
    a pair of sidewalls and a bottom wall extending between the front wall and the rear wall; and
    at least one collapsible segment formed in the pair of side walls and the bottom wall, the at least one collapsible segment continuously extending from one sidewall, along the bottom wall, to the other side wall, the at least one collapsible segment operable to facilitate expansion and retraction of the colander.

11. The assembly of claim 10, wherein the base comprises at least one extension to removably engage and support the colander.

12. The assembly of claim 10, wherein the base overlays a divider wall of a sink so as to extend within a first sink area and a second sink area.

13. The assembly of claim 12, wherein the colander is removably coupleable to the base in either the first sink area or the second sink area.

14. The assembly of claim 10, further comprising a sink accessory interchangeable with the colander.

15. A colander for use with a sink having a sink sidewall, comprising:
    a basket device removably coupleable to the sink sidewall, the basket device having a rear wall for supporting the basket on the sink sidewall, a bottom wall and first and second sidewalls forming a storage area;
    at least one collapsible segment formed in the side walls and the bottom wall, the at least one collapsible segment continuously extending from one side wall, along the bottom wall, to the other side wall, the at least one collapsible segment operable to facilitate expansion and retraction of the colander.

16. The colander of claim 15 further comprising a base coupleable to the sink sidewall, wherein the colander is removably coupleable to the base.

* * * * *